US010209781B2

(12) United States Patent
Pate et al.

(10) Patent No.: US 10,209,781 B2
(45) Date of Patent: Feb. 19, 2019

(54) INPUT DEVICE WITH CONTOURED REGION

(71) Applicant: Logitech Europe S.A., Lausanne (CH)

(72) Inventors: Christopher Pate, San Lorenzo, CA (US); Cormac O Conaire, Bray (IE); Marten Helwig, Bray (IE); James Lynch, Bray (IE)

(73) Assignee: Logitech Europe S.A., Lausanne (CH)

( * ) Notice: Subject to any disclaimer, the term of this patent is extended or adjusted under 35 U.S.C. 154(b) by 243 days.

(21) Appl. No.: 13/916,422

(22) Filed: Jun. 12, 2013

(65) Prior Publication Data

US 2013/0328781 A1 Dec. 12, 2013

Related U.S. Application Data

(60) Provisional application No. 61/658,817, filed on Jun. 12, 2012.

(51) Int. Cl.
*G06F 3/02* (2006.01)
*G06F 3/0354* (2013.01)

(52) U.S. Cl.
CPC .......... *G06F 3/0221* (2013.01); *G06F 3/0219* (2013.01); *G06F 3/03543* (2013.01)

(58) Field of Classification Search
CPC ... G06F 3/03543; G06F 3/0219; G06F 3/0221
USPC .................................................. 345/163–166
See application file for complete search history.

(56) References Cited

U.S. PATENT DOCUMENTS

| 5,063,376 A | * | 11/1991 | Chang | G06F 3/0213 341/34 |
| 5,610,602 A | * | 3/1997 | Hargreaves | 341/22 |
| 5,689,253 A | * | 11/1997 | Hargreaves | B41J 5/10 341/22 |
| 5,692,956 A | * | 12/1997 | Rifkin | A63F 13/06 345/163 |
| 6,031,518 A | * | 2/2000 | Adams | G06F 3/03543 345/156 |
| 6,285,354 B1 | * | 9/2001 | Revis | G06F 3/03543 345/163 |
| 6,333,734 B1 | * | 12/2001 | Rein | G06F 3/0213 341/22 |
| 6,377,685 B1 | * | 4/2002 | Krishnan | G06F 3/0202 379/433.07 |

(Continued)

OTHER PUBLICATIONS

Amazon.com (Nov. 30, 2010). "Razer Naga Molten MMO PC Gaming Mouse," last visited on Jan. 22, 2015, 2 pages.

(Continued)

*Primary Examiner* — Michael J Jansen, II
(74) *Attorney, Agent, or Firm* — Kilpatrick Townsend & Stockton LLP

(57) ABSTRACT

Embodiments of the invention are directed to input devices configured for use with computing devices. The present invention relates to input device configured with a plurality of input members grouped into contoured-shaped bowls on a portion of the input devices. The input device may also be configured for use with multiple hand positions and multiple profiles based on the hand positions. The input device may enable switching between user-programmable profiles, and may include sensory feedback indicating the profiles active on the input device.

14 Claims, 7 Drawing Sheets

(56) References Cited

U.S. PATENT DOCUMENTS

| | | | | |
|---|---|---|---|---|
| 6,429,852 B1* | 8/2002 | Adams | | G06F 3/03543 345/156 |
| 6,611,255 B2* | 8/2003 | Griffin | | G06F 1/1626 345/168 |
| 6,679,639 B2* | 1/2004 | Katz | | 400/488 |
| 6,698,952 B1* | 3/2004 | Goddard | | G06F 3/0216 200/5 R |
| 6,717,569 B1* | 4/2004 | Gruhl et al. | | 345/157 |
| 7,182,533 B1* | 2/2007 | Caplan | | 400/489 |
| 7,324,019 B2* | 1/2008 | Levenson | | G06F 3/0202 341/22 |
| 7,817,136 B2* | 10/2010 | Shaft et al. | | 345/163 |
| 8,079,766 B2* | 12/2011 | Kinney | | 400/489 |
| 8,100,594 B2* | 1/2012 | Chaumont et al. | | 400/472 |
| 8,116,830 B2* | 2/2012 | Go | | G06F 3/0202 455/550.1 |
| 8,125,440 B2* | 2/2012 | Guyot-Sionnest | | G06F 3/014 345/156 |
| 8,384,671 B2* | 2/2013 | Shkolnikov | | G06F 1/1626 345/169 |
| 8,614,678 B2* | 12/2013 | Wu | | G06F 3/0362 345/156 |
| 8,711,095 B2* | 4/2014 | Tan et al. | | 345/163 |
| 8,928,499 B2* | 1/2015 | Rensberger | | G06F 3/03543 341/20 |
| 9,128,539 B2* | 9/2015 | Ng | | G06F 3/03543 |
| 2002/0110237 A1* | 8/2002 | Krishnan | | 379/419 |
| 2002/0158847 A1* | 10/2002 | Griffin | | G06F 1/1626 345/168 |
| 2004/0061682 A1* | 4/2004 | Landfried | | G06F 3/03543 345/163 |
| 2005/0104854 A1* | 5/2005 | Su et al. | | 345/163 |
| 2006/0052145 A1* | 3/2006 | Go | | G06F 3/0202 455/575.1 |
| 2007/0132733 A1* | 6/2007 | Ram | | G06F 3/0227 345/163 |
| 2007/0188456 A1* | 8/2007 | Shaft et al. | | 345/163 |
| 2007/0211030 A1* | 9/2007 | Hong | | G06F 3/0202 345/163 |
| 2007/0258747 A1* | 11/2007 | Caplan | | 400/489 |
| 2007/0286663 A1 | 12/2007 | Kinney | | |
| 2008/0015115 A1* | 1/2008 | Guyot-Sionnest | | G06F 3/014 506/24 |
| 2008/0024447 A1* | 1/2008 | Hsieh et al. | | 345/163 |
| 2008/0030380 A1* | 2/2008 | Rensberger | | G06F 3/03543 341/22 |
| 2008/0101840 A1* | 5/2008 | Chaumont et al. | | 400/490 |
| 2008/0129682 A1* | 6/2008 | Algreatly | | G06F 3/0346 345/156 |
| 2009/0113091 A1* | 4/2009 | Miller | | G06F 3/046 710/64 |
| 2009/0174669 A1* | 7/2009 | Shkolnikov | | G06F 1/1626 345/169 |
| 2010/0245249 A1* | 9/2010 | Ng | | 345/166 |
| 2011/0028194 A1* | 2/2011 | Tang et al. | | 463/1 |
| 2011/0084904 A1* | 4/2011 | Tan | | 345/163 |
| 2011/0163958 A1* | 7/2011 | Yen | | G06F 3/03543 345/163 |
| 2012/0092271 A1* | 4/2012 | Liu | | G06F 3/0202 345/173 |
| 2013/0222273 A1* | 8/2013 | Tan | | 345/173 |
| 2013/0328781 A1* | 12/2013 | Pate | | G06F 3/0221 345/168 |
| 2014/0143676 A1* | 5/2014 | Tan | | G06F 3/0484 715/744 |

OTHER PUBLICATIONS

Amazon.com ( Sep. 3, 2009). "Razer Naga MMOG Laser Gaming Mouse (RZ01-00280100-R3)," last visited on Jan. 22, 2015, 3 pages.

Amazon.com (May 1, 2012). "Razer Naga Hex MOBA PC Gaming Mouse-Red," last visited on Jan. 22, 2015, 3 pages.

Amazon.com (Apr. 20, 2012). "Razer Naga MMO PC Gaming Mouse," last visited on Jan. 22, 2015, 3 pages.

Amazon.com (Nov. 30, 2010). "Razer Naga Epic Rechargable Wireless MMO PC Gaming Mouse," last visited on Jan. 22, 2015, 3 pages.

* cited by examiner

INPUT DEVICE WITH CONTOURED REGION

CROSS-REFERENCE TO RELATED APPLICATION

This application is a non-provisional application of and claims the benefit of priority of U.S. Provisional Application No. 61/658,817, titled, "Input Device With Contoured Region," filed on Jun. 12, 2012, which is herein incorporated by reference in its entirety for all purposes.

BACKGROUND OF THE INVENTION

Input devices provide a user the ability to interact with a computing device. Exemplary forms of input devices include keyboards, computer mice, stylus, or other similar forms. Most input devices in the form a computer mouse provide a user interacting with the computing device the ability to perform certain activities, including navigation, cursor control, and selection functions.

In some situations, a user's activities with the input device may require greater functionality than that provided by standard input devices. For example, computer games (e.g., massively multiplayer online role-playing game or first-person shooters) may require the user to perform tasks or operations that typically require the user to use two hands to accomplish (e.g., selecting options and controls). Tasks or operations that require two hands are typically accomplished by the user using a second hand interacting with a second device, such as a keyboard input device. This method may result in slower response time and reaction time, as the user's second hand is typically not the dominant hand. The slower response and reaction time may be detrimental to the user experience.

In previous solutions, input devices in the form of computer mice were given an increased button count in order to transfer some of the tasks and operations from the keyboard input device to the computer mouse. However, users found it difficult to keep track of their location within the additional buttons and were forced to constantly visually assess their positions, which resulted in a negative user experience.

Based on the foregoing, there is a need in the art for improved methods and systems for input devices that provide greater functionality and better user experience.

SUMMARY OF THE INVENTION

The present invention relates generally to control devices, such as human interface devices, configured for use with electronics or computing devices. More specifically, the present invention relates to methods and systems for utilizing an input device capable of providing greater functionality through two groups of buttons embedded on a side of an input device in the form of a computer mouse. The present invention provides a better user experience by arranging the buttons into two concaved shaped bowls in the computer mouse that provides greater blind-use position recognition.

Embodiment of the present invention may provide an input device comprising housing, and a plurality of input members disposed on the housing in a plurality of groups. The input device further comprises a first group of input members and a second group of input members of the plurality of groups. The first group of input members and a second group of input members are each contoured into a bowl shape on the housing. The input device further comprises a third group of input members of the plurality of groups, including a mode switch input member configured to switch between one or more profiles associated with the first group of input members and the second group of input members of the plurality of groups.

In some embodiments of the present invention, each of the first group of input members and the second group of input members of the plurality of groups includes six input members. Further, each input member in the first group of input members and the second group of input members may be configured into a different shape from the other input members in the group. The first group of input members and the second group of input members of the plurality of groups may be disposed on a side portion of the housing. The third group of input members of the plurality of groups may be disposed on a top portion of the housing.

In some embodiments of the present invention, each of the first group of input members and the second group of input members of the plurality of groups is contoured into a concaved bowl shape with respect to the housing. In some embodiments, at least one portion of each of the first group of input members and the second group of input members may be angled toward a center of the concaved bowl shape.

In some embodiments of the present invention, the housing is configured to support a hand in a plurality of positions, including a first hand position, a second hand position, and a third hand position. Each position in the plurality of positions may be associated with a different selection of the first group of input members and the second group of input members. For example, the first hand position may be associated with the first group of input members, the second hand position may be associated with the second group of input members, and the third hand position may be associated with both the first group of input members and the second group of input members.

In some embodiments of the present invention, the input device may further comprise a light-emitting element disposed on the housing configured to emit a plurality of colors. In such embodiments, each color in the plurality of colors may indicate the profile associated with the plurality of input members. The profile may indicate configuration of the plurality of input members.

Embodiment of the present invention may further provide an input device comprising housing, and a plurality of input members disposed on the housing in a plurality of groups. Each of a first group of input members and a second group of input members of the plurality of groups is contoured into a bowl shape on the housing, and each of the first group of input members and the second group of input members is associated with different hand positions of a user on the input device.

In such embodiments, the housing is configured to support the different hand positions of the user on the input device, including a first hand position, and a second hand position. In such embodiments, when the input device is in a first mode, the first group of input members is associated with the first hand position and a set of functions. When the input device is in a second mode, the set of functions are assigned to the second group of input members associated with the second hand position. When the input device is in a third mode, the set of functions are assigned to both the first and second groups of input members. In such embodiments of the present invention, an input member in a third group of input members may be a mode switch input member configured to switch the input device between one or more profiles associated with the first group of input members and the second group of input members.

Numerous benefits are achieved by way of the present invention over other techniques. For example, user experience, such as gameplay, is better served as the user may need to only move their thumb on the input device a small amount in order to access a large selection of options, rather than having to interact with a second device (e.g., a keyboard) using a second hand. In addition, the two groups of buttons can also each be programmed and used separately or in combination based on comfort and on the placement of the user's hand on the gaming device. The arrangement of the two groups of buttons supports users who clutch the input device in different ways (e.g., fingertip, palm, claw grips), while still providing the functionality of the two groups of buttons.

These and other embodiments of the invention along with many of its advantages and features are described in more detail in conjunction with the text below and attached figures.

DETAILED DESCRIPTION OF SPECIFIC EMBODIMENTS

Embodiments of the present invention are generally directed to an input device. Embodiments are described with respect to an input device in the form of a computer mouse device. However, embodiments of the invention present are not limited to input devices in the form of computer mouse devices. Other embodiments contemplate input devices in other forms, including, but not limited to, touchpad input devices and other handheld input devices.

Figure 1A:
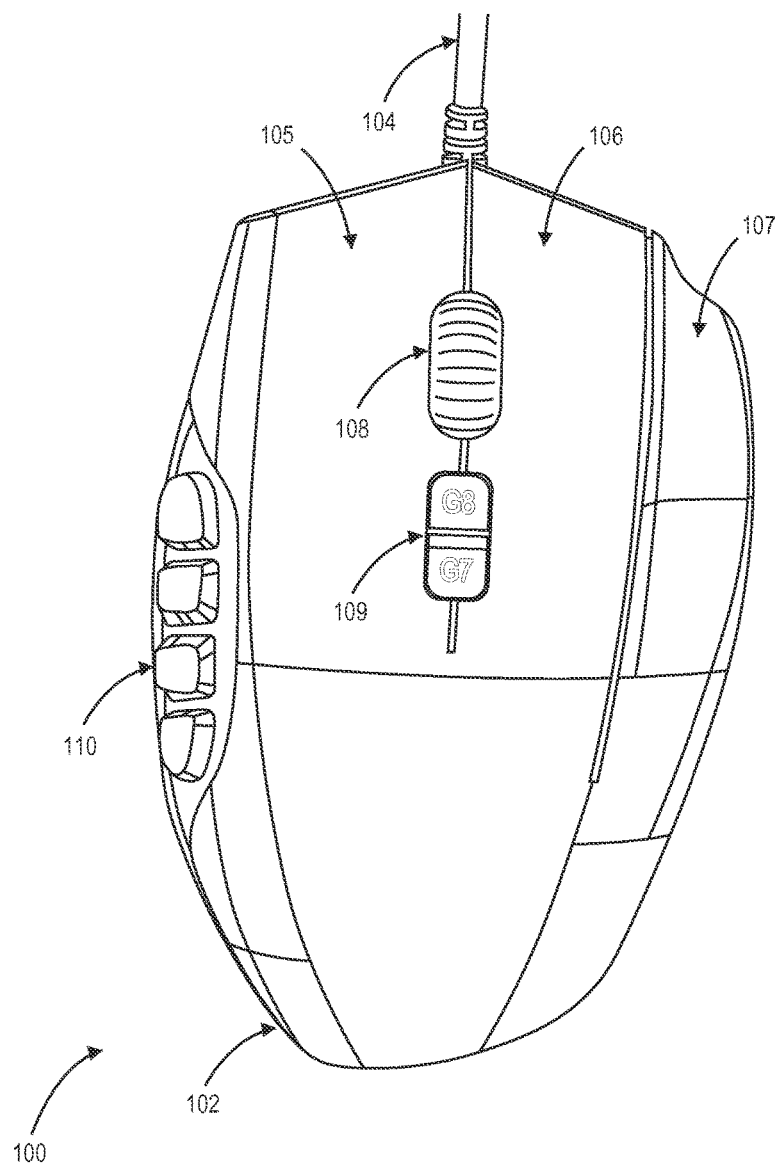
FIG. 1A is a top view of an input device according to an embodiment of the present invention.
Figure 1B:
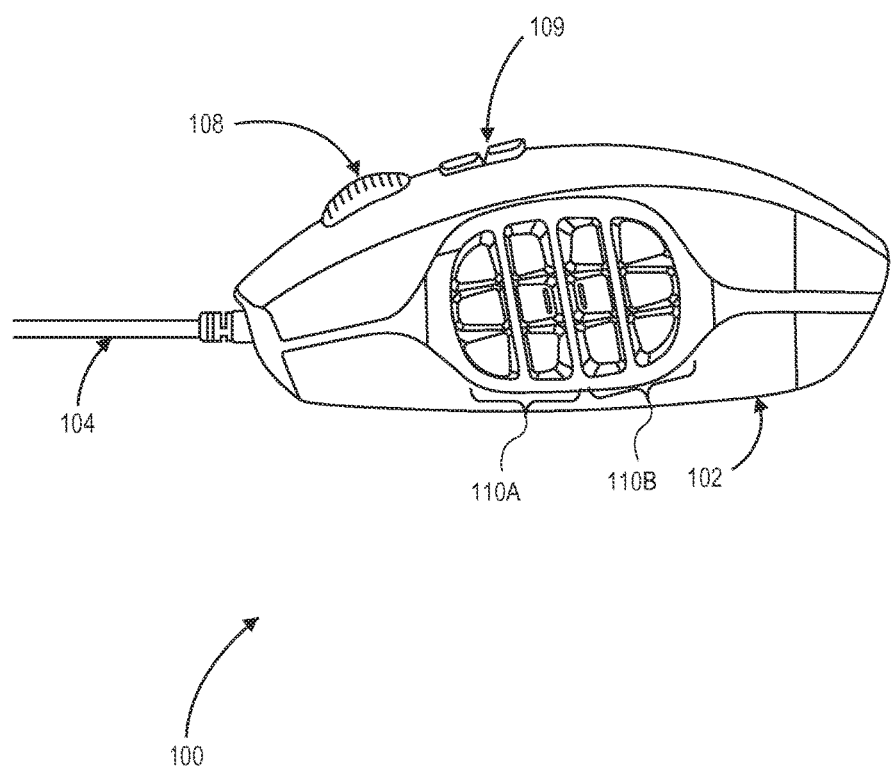
FIG. 1B is a side view of an input device according to an embodiment of the present invention.

FIG. 1A is a top view of an input device 100 according to an embodiment of the present invention. The input device 100 may include a main body housing 102 (which can also be referred to as a "housing" or a "input device housing"), three buttons (which can also be referred to as "input members") 105-107 disposed along the top portion of the main body housing 102, a scroll wheel button 108, a group of switch buttons 109, and two groups of buttons 110 configured into a bowl shape on the side of the main body housing 102. The scroll wheel button 108 and the group of switch buttons 109 may also be disposed along the top portion of the main body housing 102. The plurality of buttons may be disposed on the housing in a plurality of groups, as depicted in FIGS. 1A and 1B. In some embodiments, each of the buttons in the two groups of buttons 110 may include a lighting feature, including, but not limited to a back lighting. In some embodiments, all of the buttons on the input device 100 may include a lighting feature behind each keycap of the two groups of buttons 110. In some embodiments, the input device 100 is a multi-modal mouse. The input device 100 may be configured to control various aspects of a computer or computing device. In some embodiments, the input device 100 can be hardwired, wirelessly coupled, or integrated into the computer. In some embodiments where the input device 100 is hardwired, the input device 100 may further include a connection cord 104 for connection to the computer. In some embodiments, where the input device 100 is wirelessly coupled to the computing device, the input device 100 may further be Bluetooth™ enabled, or use any other form of wireless communications, for connecting to the computing device.

The scroll wheel button 108 may be configured to access and select a plurality of functions. In addition to a scrolling function, different control functions may be selected when the scroll wheel button 108 is pressed downwards, pressed to the left or pressed to the right.

The group of mode switch buttons (or mode switch buttons) 109 may allow for changing the operation of the other, input members on the input device 100. A first mode switch button may be configured to control the mode of the input device 100. Each of the input members disposed on the input device 100 may be assigned a different function according to the mode established by the state of the mode switch buttons 109. For example, in different modes, a user may configure the input members on the input device 100 to activate certain functions of one computer game (e.g., a massively multiplayer online role-playing game or MMORPG), and may configure these same buttons to activate different functions for a different game when switched to a different mode. Each game may be associated with a mode (or profile) corresponding to a state of the first mode switch button. In an embodiment, pressing the first mode switch button in the group of mode switch buttons 109 selects the next mode in a list of configured modes. Once a mode is selected, the input device 100 may continue to operate in the selected mode until the mode is changed by depressing the first mode switch button again. Thus, there may be two or more modes selected by the first mode switch button. A second mode switch button in the group of switch buttons 109 may temporarily alter the function of an input member on the input device 100. The altered function may be selected when the second mode switch button and an input member are depressed simultaneously.

FIG. 1B is a side view of an input device 100 according to an embodiment of the present invention. FIG. 1B depicts a left side view of a right-handed input device 100 embodied as a multi-modal mouse 100. As depicted in FIG. 1B, the two groups of buttons 110 on the side of the main body housing 102 are grouped into four rows, each containing three buttons. Other embodiments of the present invention contemplate the two groups of buttons 110 arranged in a different combination. As depicted in FIG. 1B, each of the two groups of buttons 110 includes six input members. Other embodiments may include greater than or fewer than six input members.

Figure 3A:
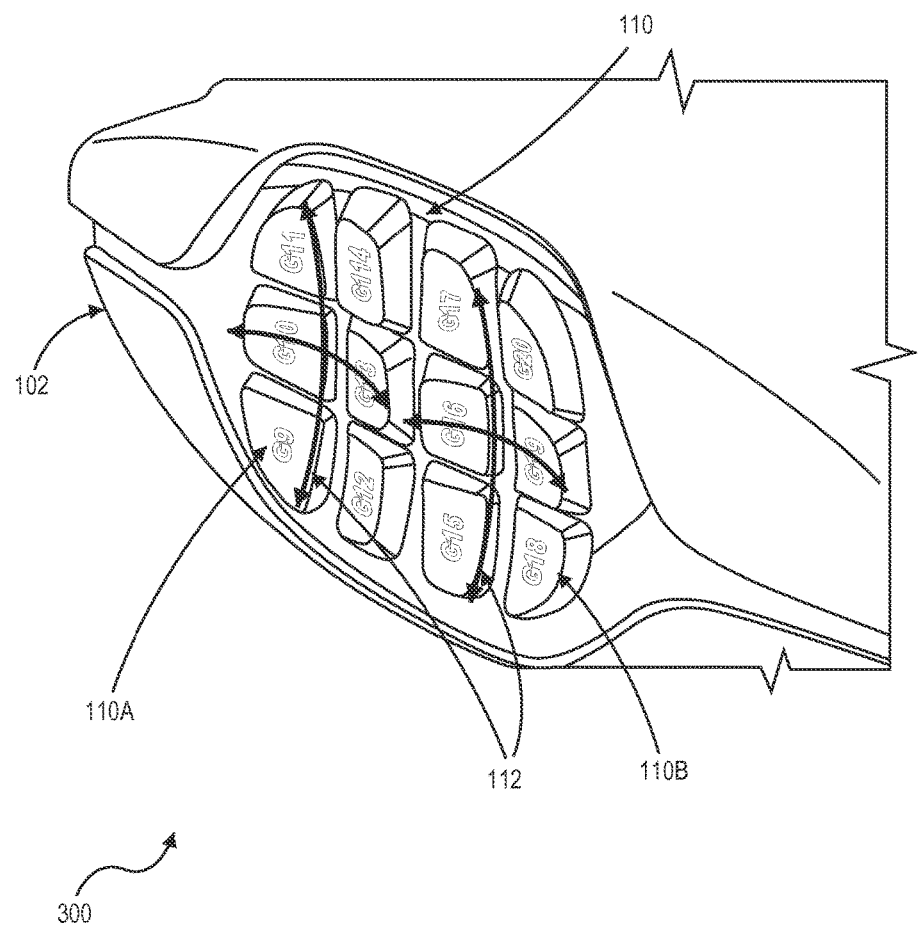
FIG. 3A is an angled view of an input device according to an embodiment of the present invention.

A first group of buttons 110A of the two groups of buttons 110 may be housed toward the front of the left side of the input device 100 and the second group of buttons 110B of the two groups of buttons 110 may be housed toward the rear of the left side of the input device 100. Each group of buttons 110A and 110B is contoured both left/right and top/bottom in a concaved shaped, forming a bowl as illustrated in FIG. 3A. In some embodiments of the present invention, each input member in the two groups of buttons 110 is configured into a different shape from the other input members in the two groups of buttons 110. In such embodiments, from the center of each bowl of each group of buttons 110A and 110B, a thumb of the user, resting comfortably on the left side of the mouse, can feel the bounds and position of each of the buttons in the bowl of each group of buttons 110A and 110B in order to identify the position of their thumb within each group and which button to press.

In some embodiments of the present invention, the force required to select or activate one of the input members in the two groups of buttons 110 is greater than for typical input devices. As most of the user's thumb is resting over one of the input members in the two groups of buttons 110, a greater activation force may prevent accidental or premature activation of an input member if the user's grip tightens on the input device 100.

The housing may be configured to support a hand in a plurality of positions, including a first hand position, a second hand position, and a third hand position. In some embodiments, each position in the plurality of positions is associated with a different selection of the first group of input members and the second group of input members. For example, the first hand position may be associated with the first group of input members, the second hand position may be associated with the second group of input members, and the third hand position may be associated with both the first group of input members and the second group of input members. In some embodiments, when the hand of the user is in the first hand position, the second group of input members may be non-functional or not set to control any functions or operations. In some embodiments, the second group of input members may be set to control less frequently used functions or operations. In other embodiments, when the hand of the user is in the second hand position when the user is in the first hand position, the first group of input members may be non-functional or not set to control any functions or operations. In some embodiments, the first group of input members may be set to control less frequently used functions or operations when the user is in the second hand position. In some embodiments, the user may establish that when the mode/profile is switched, the operations/functions assigned to first group of buttons 110A are reassigned to the second group of buttons 110B, and vice versa.

Figure 2:
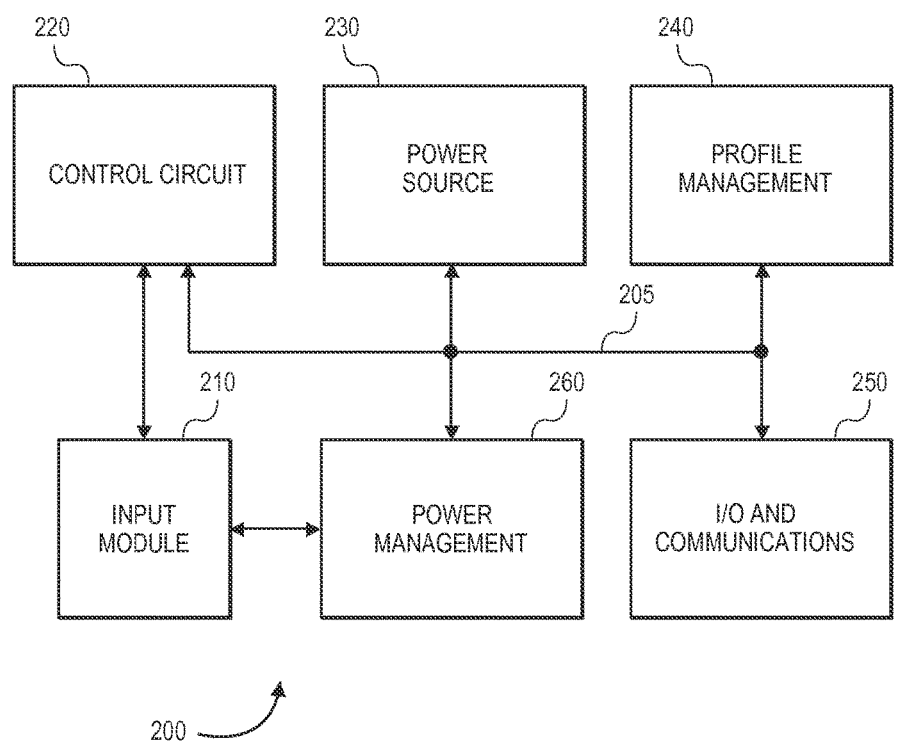
FIG. 2 is a simplified block diagram of the components of an input device according to an embodiment of the present invention.

FIG. 2 is a simplified block diagram of the components of an input device 100 according to an embodiment of the present invention. The input device 100 may be in the form of a multi-modal mouse 100. In other embodiments, the input device 100 may be a keyboard device or touchpad device. The input device 100 includes a bus 205, an input module 210, a control circuit 220, a power source 230, a profile management module 240, an input/output (I/O) and communications system 250, a power management system 260, and a memory component 270. The control circuit 220, solar panel 230, secondary power source 240, input/output (I/O) and communications system 250, power management system 260, and memory component 270, are in electronic communication with one another via the bus 205. The input module 210 is independently connected to the control circuit 220 and power management block 260. In some embodiments, the input module 210 may be connected to the other modules via the bus 205. It should be noted that many other bus 205 configurations can be used that can include or exclude any of the various system elements of the input device 100 as would be known by one of ordinary skill in the art.

In some embodiments, the input module 210 can include a plurality of input elements or devices. In such embodiments, the input module 210 is operable to receive input in response to a user pressing an input member (e.g., the group of buttons 108, and the two groups of buttons 110 configured into a bowl shape on the side of the main body housing 102), the scroll wheel 104, or other suitable input element or device such as a media control button, voice-over-internet-protocol (VoIP) button, touch sensors (e.g., touch pads) and the like. The input module 210 is capable of generating control data associated with the pressed input element and sending the control data to the control circuit 220.

In some embodiments, the control circuit 220 comprises one or more microprocessors (μCs), and the control circuit 220 is configured to control the operation of the input device 100. Alternatively, the control circuit 220 may include one or more microcontrollers (MCUs), digital signal processors (DSPs), field programmable gate arrays (FGPA), programmable logic devices (PLDs), or the like, with supporting hardware/firmware (e.g., memory, programmable I/Os, etc.), as would be appreciated by one of ordinary skill in the art with the benefit of this disclosure. Alternatively, MCUs, μCs, DSPs, and the like, may be configured in other system blocks of the input device 100. For example, a microprocessor in the computer can be configured to process input commands from the input module 210 via a wireless or hardwired connection.

The power source 230 may be configured to provide power to the input device 100. In some embodiments, the power source 230 can include one or more rechargeable batteries including, but not limited to, the following types: lead-acid, alkaline, nickel cadmium (NiCd), nickel metal hydride (NiMH), lithium ion (Li-ion), lithium ion polymer (Li-ion polymer), or other rechargeable battery type known by those of ordinary skill in the art. In certain embodiments, the one or more rechargeable batteries can include AA type, AAA type, button cells (e.g., commonly found in watch batteries, hearing aid batteries, etc.), or other similarly sized battery types.

The I/O and communications block 250 may be configured to provide input/output capabilities to the input device 102. For example, the I/O and communications block 250 can route data from the input module 210 to the computer system via a hardwire link or wireless connection. The I/O and communications block 250 can route control data, media control data, VoIP data, touch sensor data, and the like, to the computer for further processing. The wireless connection can be Bluetooth™ or any other wireless standard or proprietary wireless network protocol.

The power management block 260 may be configured to manage the electrical power supplied by power source 230. In some embodiments, the power management block 260 can route power directly from the power source 230 to the input device 102. The power management block 260 can further distribute power from the power source 230 to the other system components (e.g., control circuit 220, I/O and communications block 250 and the input module 210, or any combination thereof).

The profile management component 240 may be configured to store profile data for the various input members (106, 108, and 110) disposed on the input device 102. In some embodiments, the profile management component 270 is a non-volatile memory. In some embodiments, the profile management component 270 can store the data for a plurality of profiles for a user for controlling the computer using the input device 102. The profile data may be stored in the profile management component 270 even when the input device 102 is powered down, such that when the input device 102 is reactivated, the previously stored profile data may be accessed. In some embodiments, the user can switch between the plurality of profiles for the user associated with the first group of input members and the second group of input members by operating the mode switch buttons 109.

In some embodiments, the profile management component 240 may be further configured to control the backlighting feature of the input members. A light-emitting element disposed on the main body housing 102 may be configured to emit a plurality of colors through caps for the two groups of buttons 110 configured into a bowl shape on the side of the main body housing 102. In such embodiments, each color in the plurality of colors may indicate to the user the selected profile associated with the plurality of input members, and may indicate the configuration of the plurality of input members in the two groups of buttons 110. For example, when the user is playing a computer game using the input device 102, a blue backlight for the two groups of buttons 110 may indicate that the two groups of buttons 110 are configured for a "weapons" selection, while a red backlight for the two groups of buttons 110 may indicate that they are configured for a "spells" selection.

In some embodiments, other sources of sensory feedback may be associated with the input members. In some embodiments, a light source such as a light emitting diode (LED) may provide sensory feedback to the user. In some embodiments, light source may be embedded in each of the input members. In an alternative embodiment, the light source may be embedded in a portion of the main body housing 102 of the input device 100. In some embodiments, each profile may be associated with a different color LED. In other embodiments, the sensory feedback is in the form of an auditory or tactile feedback (i.e., a different sound or vibration may be emitted for each profile established for the input device 100).

FIG. 3A is an angled view of an input device 300 according to an embodiment of the present invention. FIG. 3A depicts the two groups of buttons 110 that may be disposed on the left side of the input device 300. As described previously, each group of buttons 110A and 110B is contoured left/right and top/bottom in a concaved shaped, forming a bowl shaped in input device 300. The contours of each group of buttons 110A and 110B is demonstrated by the crosshairs 112 superimposed over each group of buttons 110A and 110B. The layout of the input keys shown in FIG. 3A is merely for illustration. In some embodiments, the layout of the input members may be different from the layout shown in FIG. 3A. For example, the input device 300 includes six input members in each group of buttons 110A and 110B.

Figure 3B:
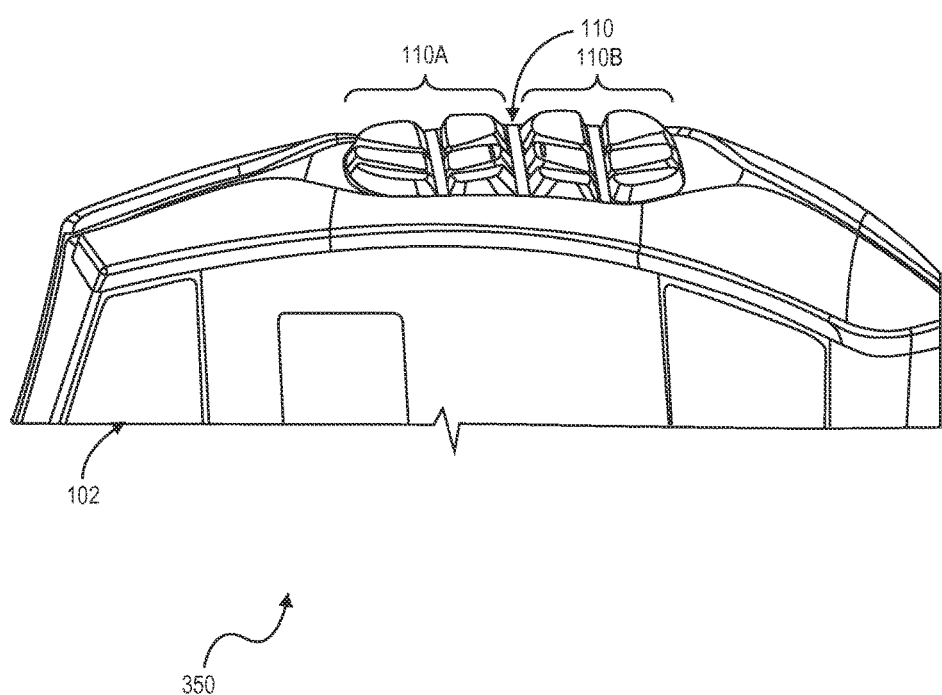
FIG. 3B is a profile view of an input device according to an embodiment of the present invention.

FIG. 3B is a profile view of an input device 350 according to an embodiment of the present invention. The profile view in FIG. 3B is shown from the bottom of the input device 350 along the left side of a right-handed input device 350 providing an angled profile view of the two groups of buttons 110 disposed on the left side of the input device 300. As depicted, each input member in the first group of buttons 110A are contoured and configured such that each input member has at least one corner angled towards the center of the first group of buttons 110A. Similarly, each input member in the second group of buttons 110B are contoured and configured such that each input member has at least one corner angled towards the center of the second group of buttons 110B.

Figure 4A:
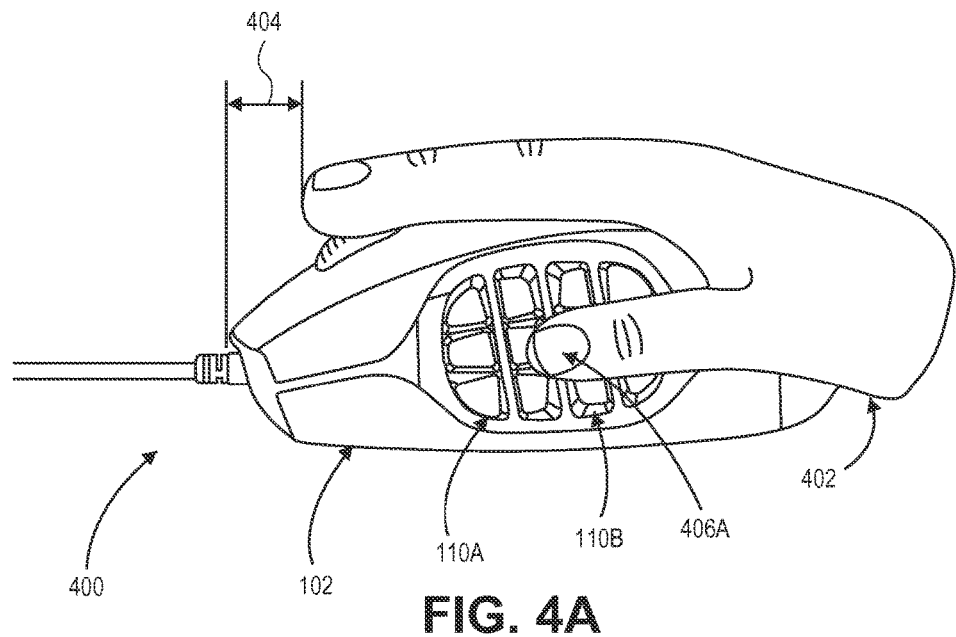
FIGS. 4A and 4B are side views of a hand position on an input device according to an embodiment of the present invention.
Figure 4B:
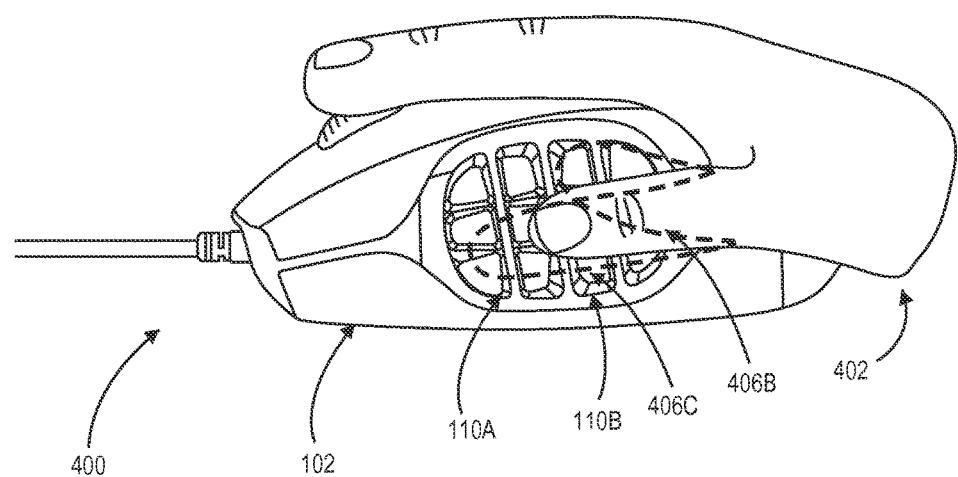

FIGS. 4A and 4B are side views of a hand position on an input device according to an embodiment of the present invention. As depicted in FIGS. 4A and 4B, the hand 402 is in a "claw" grip position. In the "claw" grip position, the placement of the hand 402 is such that the palm of the hand 402 does not necessarily stay in contact with the input device 100 and the tip of the finger is a medium distance 404 from the top edge of the input device 100. When the hand 402 is in the "claw" grip position, a thumb may be in a central position between the two groups of buttons 110, as depicted as hand position 406A. As the thumb is centralized on the two groups of buttons 110, it provides the user the ability to move their thumb to a position 406B centralized on the second group of buttons 110B. The user may also move their thumb to a position 406C where the thumb is centralized on the first group of buttons 110A.

Figure 5A:
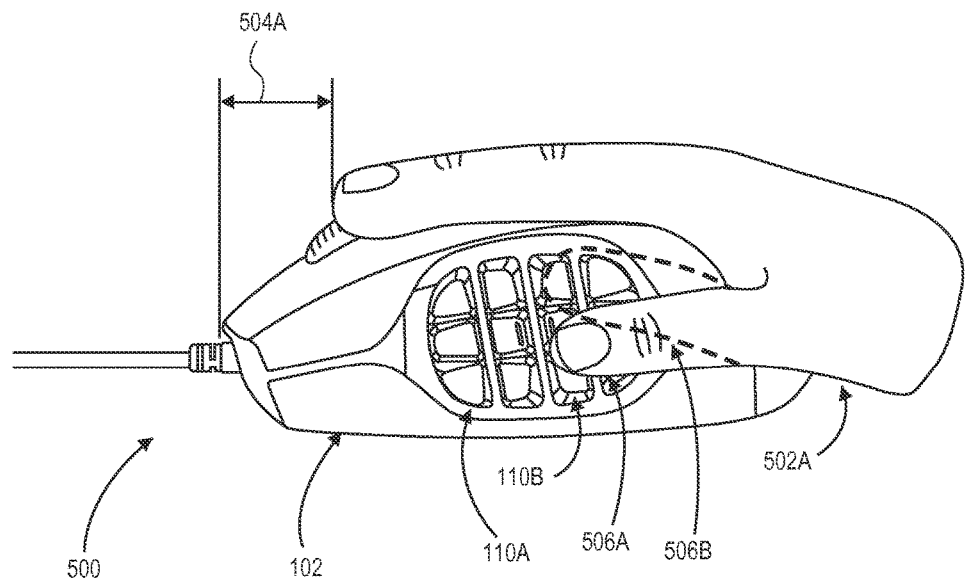
FIGS. 5A and 5B are side views of alternate hand positions on an input device according to embodiments of the present invention.
Figure 5B:
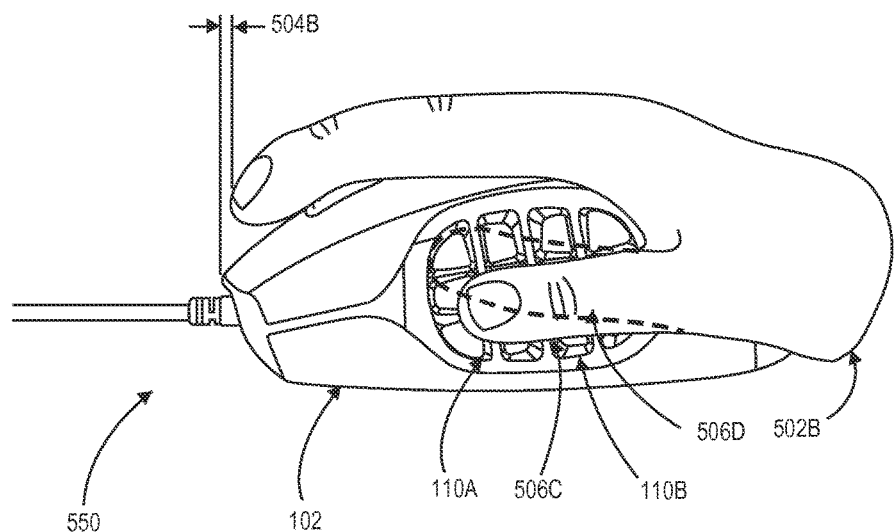

FIGS. 5A and 5B are side views of alternate hand positions on an input device according to an embodiment of the present invention. In FIG. 5A, the hand 502A is in a "fingertip" grip position. In the "fingertip" grip position, the placement of the hand 502A is such that the user's hand 502A has a lighter grip on the input device 100. The position in FIG. 5A is typically used for computer games requiring faster, abrupt movements. In the "fingertip" grip, the palm of the user may not be in contact with the input device 100 and the tip of the finger is a larger distance 504A from the top edge of the input device 100 than in the "claw" position. As the thumb is set further back on the two groups of buttons 110, the user's thumb may be more centralized on the second group of buttons 110B such that the movement of the thumb may more typically be similar to that from 506A to 506B. In FIG. 5B, the hand 502A is in a "palm" grip position. In the "palm" grip position, the placement of the hand 502B is such that the user's hand 502b has a stronger grip on the input device 100. In the "palm" grip, the palm of the user may be fully contacted with the input device 100 and the tip of the finger is a short distance 504B from the top edge of the input device 100. As the thumb is set further forward on the two groups of buttons 110, the user's thumb may be more centralized on the first group of buttons 110A such that the movement of the thumb may more typically be similar to that from 506C to 506D.

In some embodiments of the present invention, the user may configure only one group of the two groups of buttons 110 to control functions. For example, a user who user a "fingertip" grip may configure only the second group of buttons 110B for use.

In some embodiments of the present invention, the user may configure each group of the two groups of buttons 110 to control the same functions. For example, if each group of the two groups of buttons 110 has six buttons, the user may configure the six buttons in the first group of buttons 110A to control the same six functions as the six buttons in the second group of buttons 110B. In such embodiments, the user is able to position their hand in a plurality of different positions and still be able to easily access the six functions associated with each of the six buttons.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "an", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A computer input device comprising:
    a housing including:
        a top portion;
        a bottom portion to move along a work surface; and
        a side portion; and
    a plurality of buttons disposed on the side portion,
        wherein each of the plurality of buttons includes a top surface,
        wherein the top surface of each of the plurality of buttons is contoured such that the plurality of buttons forms a bowl shape with a common center, and
        wherein each of the plurality of buttons is of a different shape.

2. The computer input device of claim 1 further comprising:
    a second plurality of buttons disposed on the side portion,
    wherein the second plurality of buttons is adjacent to the plurality of buttons, and
    wherein each of the second plurality of buttons includes a top surface,
    wherein the top surface of each of the second plurality of buttons is contoured such that the second plurality of buttons forms a bowl shape, and
    wherein each of the second plurality of buttons is of a different shape.

3. The computer input device of claim 2 further comprising:
    a mode switch button including a first control state and a second control state; and
    a processor to control:
        the mode switch button;
        the plurality of buttons; and
        the second plurality of buttons,
            wherein the processor generates a set of functions,
            wherein the set of functions are associated with the plurality of buttons when the mode switch button is set to the first control state, and
            wherein the set of functions are associated with the second plurality of buttons when the mode switch button is set to the second control state.

4. The computer input device of claim 2 further comprising:
    a profile selection button to select between at least a first profile and a second profile,
        wherein the first profile defines a first set of functions, and
        wherein the second profile defines a second set of functions; and
    a processor to control:
        the profile selection button;
        the plurality of buttons; and
        the second plurality of buttons,
            wherein the first profile is associated with the plurality of buttons when the profile selection button is set to the first profile, and
            wherein the first profile is associated with the second plurality of buttons when the profile selection button is set to the second profile.

5. The computer input device of claim 4 further comprising a light-emitting element, controlled by the processor and disposed on the housing, to emit any of a plurality of colored light, wherein the processor causes the light-emitting element to emit one of the plurality of colored light based on the selected profile.

6. The computer input device of claim 1 wherein the plurality of buttons includes six buttons.

7. The computer input device of claim 1 wherein the side portion of the housing is concave.

8. A computer mouse comprising:
    a housing including:
        a top portion;
        a bottom portion to move along a work surface; and
        a side portion;
    a first plurality of buttons disposed on the side portion,
        wherein each of the first plurality of buttons has a different shape; and
    a second plurality of buttons disposed on the side portion,
        wherein each of the second plurality of buttons has a different shape,
    wherein each button of the first plurality of buttons and each button of the second plurality of buttons includes a top surface,
    wherein the top surface of each of the first plurality of buttons is contoured such that the first plurality of buttons forms a bowl shape having a common center, and
    wherein the top surface of each of the second plurality of buttons is contoured such that the second plurality of buttons forms a bowl shape having a common center.

9. The computer mouse of claim 8 further comprising:
    a mode switch button including a first control state and a second control state; and
    a processor to control:
        the mode switch button;
        the first plurality of buttons; and
        the second plurality of buttons,
            wherein the processor generates a set of functions,
            wherein a set of functions are associated with the first plurality of buttons when the mode switch button is set to the first control state, and
            wherein the first set of functions are associated with the second plurality of buttons when the mode switch button is set to the second control state.

10. The computer mouse of claim 9 wherein the mode switch button includes a third control state, and wherein the set of functions are associated with both the first plurality of buttons and the second plurality of buttons when the mode switch button is set to the third control state.

11. The computer mouse of claim 8 forth comprising:
    a profile selection button to select between at least a first profile and a second profile,
        wherein the first profile defines a first set of functions, and
        wherein the second profile defines a second set of functions; and
    a processor to control:
        the profile selection button; and
        the plurality of buttons, wherein the first profile is associated with the first plurality of buttons when the profile selection button is set to the first profile, and wherein the first profile is associated with the second plurality of buttons when the profile selection button is set to the second profile.

12. The computer mouse of claim 11 further comprising:

a light-emitting element, controlled by the processor and disposed on the housing, to emit any of a plurality of colored light, wherein the processor causes the light-emitting element to emit one of the plurality of colored light based on the selected profile.

13. The computer mouse of claim 8, wherein the first plurality of buttons includes six buttons.

14. The computer mouse of claim 13 wherein the second plurality of buttons includes six buttons.

* * * * *